United States Patent
Benkreira et al.

(10) Patent No.: US 11,810,145 B2
(45) Date of Patent: Nov. 7, 2023

(54) SYSTEMS AND METHODS FOR PROMOTING TRANSACTION REWARDS

(71) Applicant: Capital One Services, LLC, McLean, VA (US)

(72) Inventors: Abdelkader Benkreira, New York, NY (US); Joshua Edwards, Philadelphia, PA (US); Adam Vukich, Springfield, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/832,458

(22) Filed: Mar. 27, 2020

(65) Prior Publication Data
US 2021/0304242 A1    Sep. 30, 2021

(51) Int. Cl.
| | | |
|---|---|---|
| *G06Q 30/00* | (2023.01) | |
| *G06Q 30/0226* | (2023.01) | |
| *H04W 4/12* | (2009.01) | |
| *G06Q 30/0207* | (2023.01) | |

(52) U.S. Cl.
CPC ..... *G06Q 30/0226* (2013.01); *G06Q 30/0224* (2013.01); *G06Q 30/0239* (2013.01); *H04W 4/12* (2013.01)

(58) Field of Classification Search
USPC .................................................... 705/14.27
See application file for complete search history.

(56) References Cited

U.S. PATENT DOCUMENTS

| | | |
|---|---|---|
| 8,001,105 B2 | 8/2011 | Bolivar et al. |
| 9,727,891 B2 | 8/2017 | Mezzacca |
| 10,757,154 B1* | 8/2020 | Jacobs ................... G06Q 40/03 |
| 2003/0004798 A1 | 1/2003 | McAuliffe et al. |
| 2008/0015938 A1* | 1/2008 | Haddad ............. G06Q 30/0268 705/14.38 |
| 2008/0281714 A1* | 11/2008 | Kluth ..................... G06Q 30/06 705/26.1 |
| 2009/0018916 A1 | 1/2009 | Seven et al. |
| 2011/0153401 A1 | 6/2011 | Jellema et al. |
| 2012/0190386 A1* | 7/2012 | Anderson ............... G01S 19/14 455/456.3 |

(Continued)

FOREIGN PATENT DOCUMENTS

AU          2013200110 A1     7/2017

*Primary Examiner* — Kambiz Abdi
*Assistant Examiner* — Christopher Stroud
(74) *Attorney, Agent, or Firm* — Bookoff McAndrews, PLLC

(57) ABSTRACT

A computer-implemented method of providing a notification to a user may include: obtaining a plurality of trigger conditions; monitoring a web session of the user to determine whether a trigger condition of the plurality of trigger conditions is satisfied; and in response to determining that the trigger condition is satisfied, executing a notification process, wherein the notification process includes: obtaining vendor information based on the trigger condition that is triggered, the vendor information including information associated with one or more vendors associated with the trigger condition that is triggered and/or alternative offer information associated with the one or more vendors; and causing display of a notification, the notification including information corresponding to the one or more vendors and/or the alternative offer information.

18 Claims, 5 Drawing Sheets

(56) References Cited

U.S. PATENT DOCUMENTS

| | | | |
|---|---|---|---|
| 2013/0013391 A1* | 1/2013 | Douglas | G06Q 30/0241 705/14.39 |
| 2013/0073459 A1* | 3/2013 | Zacarias | G06Q 30/08 705/41 |
| 2013/0085807 A1 | 4/2013 | Cincotta | |
| 2013/0159081 A1* | 6/2013 | Shastry | G06Q 20/20 705/14.23 |
| 2013/0193201 A1 | 8/2013 | Bradley et al. | |
| 2014/0046748 A1* | 2/2014 | Nagarajan | G06Q 30/02 705/14.35 |
| 2014/0074584 A1 | 3/2014 | Fisher | |
| 2015/0026267 A1* | 1/2015 | Chakra | H04L 69/16 709/206 |
| 2015/0046243 A1* | 2/2015 | Ricci | G06Q 40/025 705/14.23 |
| 2015/0051955 A1* | 2/2015 | Kumar | G06Q 30/0206 705/7.35 |
| 2015/0100404 A1* | 4/2015 | Globe | G06Q 30/0226 705/14.27 |
| 2015/0242892 A1* | 8/2015 | Priebatsch | G06Q 30/0255 705/14.53 |
| 2015/0324881 A1* | 11/2015 | Ouimet | G06Q 30/02 705/14.49 |
| 2015/0363842 A1* | 12/2015 | Hoyne | G06Q 30/0283 705/7.35 |
| 2015/0379601 A1* | 12/2015 | Ouimet | G06Q 30/0613 705/26.41 |
| 2016/0086222 A1* | 3/2016 | Kurapati | G06Q 30/0261 705/14.53 |
| 2017/0186027 A1 | 6/2017 | Hudson et al. | |
| 2017/0278136 A1* | 9/2017 | Johnson | G06F 3/0482 |
| 2018/0249205 A1* | 8/2018 | Li | H04N 21/44008 |
| 2018/0268383 A1* | 9/2018 | Kim | G06Q 20/321 |

\* cited by examiner

SYSTEMS AND METHODS FOR PROMOTING TRANSACTION REWARDS

TECHNICAL FIELD

Various embodiments of the present disclosure relate generally to methods and systems for promoting transaction rewards, and relate particularly to providing notifications of transaction rewards to a user based on user activity.

BACKGROUND

Transaction servicers, such as credit card companies, may offer rewards programs as an incentive to customers to use their transaction service over competitors. For example, customers may receive cash back, reward points, or other benefits as a reward for completing a transaction by using a particular servicer. In some examples, rewards are provided or increased based on transaction in a particular category of goods or services, or transactions with a particular vendor.

However, potential customers may not be aware of the various rewards that may be available. Categories of transactions and/or vendors that carry increased rewards may change over time, and the magnitude of rewards may also vary over time. Moreover, such information may not be accessible or convenient to the potential customer when making a purchasing decision. If a potential customer is not aware of a potential reward available for a particular vendor, the potential customers may end up completing a transaction with a different vendor, and miss out on the reward. Thus, the customer may lose out on the value added by such a reward, the particular vendor may lose out on the business that may otherwise have been incentivized by the reward, and the transaction servicer may lose out on the customer good will otherwise merited by providing the reward to the customer.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure methods, systems, and non-transitory computer-readable media are disclosed for generating and/or providing transaction reward notifications to a user. Each of the examples disclosed herein may include one or more of the features described in connection with any of the other disclosed examples.

In one example, an exemplary embodiment of computer-implemented method of providing a notification to a user may include: obtaining a plurality of trigger conditions; monitoring a web session of the user to determine whether a trigger condition of the plurality of trigger conditions is satisfied; and in response to determining that the trigger condition is satisfied, executing a notification process. The notification process may include: obtaining vendor information based on the trigger condition that is triggered, the vendor information including information associated with one or more vendors associated with the trigger condition that is triggered and/or alternative offer information associated with the one or more vendors; and causing display of a notification, the notification including information corresponding to the one or more vendors and/or the alternative offer information.

In another exemplary embodiment, a system for generating a notification for a user may include: a memory storing instructions; and a processor executing the instructions to perform a process that may include: obtaining a plurality of trigger conditions; monitoring a web session of the user to determine whether a trigger condition of the plurality of trigger conditions is satisfied; and in response to determining that the trigger condition is satisfied, executing a notification process, wherein the notification process includes: obtaining vendor information based on the trigger condition that is triggered, the vendor information including information associated with one or more vendors associated with the trigger condition that is triggered and/or alternative offer information associated with the one or more vendors; and causing display of a notification, the notification including information corresponding to the one or more vendors and/or the alternative offer information.

In an additional exemplary embodiment, a method for redirecting a user to a relevant entity may include: obtaining a plurality of trigger conditions, the plurality of trigger conditions including a first trigger condition, a second trigger condition, a third trigger condition, and a fourth trigger condition, the first trigger condition associating a first set of uniform resource locators (URLs) with a first set of transaction intentions to determine a mapped transaction intention, the second trigger condition associating user activity on webpages of a second set of URLs with a second set of transaction intentions to determine a specific transaction intention, the third trigger condition analyzing a currently viewed webpage to determine a webpage transaction intention, the fourth trigger condition analyzing a search query entered by the user to determine a search transaction intention; monitoring a web session of a user to determine whether a trigger condition of the plurality of trigger conditions is triggered; and in response to the determining that the trigger condition rule is triggered, executing a notification process, wherein the notification process may include: obtaining vendor information based on the trigger condition that is triggered, the vendor information including one or more vendors associated with the trigger condition that is triggered and/or alternative offer information associated with each of the one or more vendors; and causing display of a notification, the notification including information corresponding to the one or more vendors and the associated alternative offer information.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
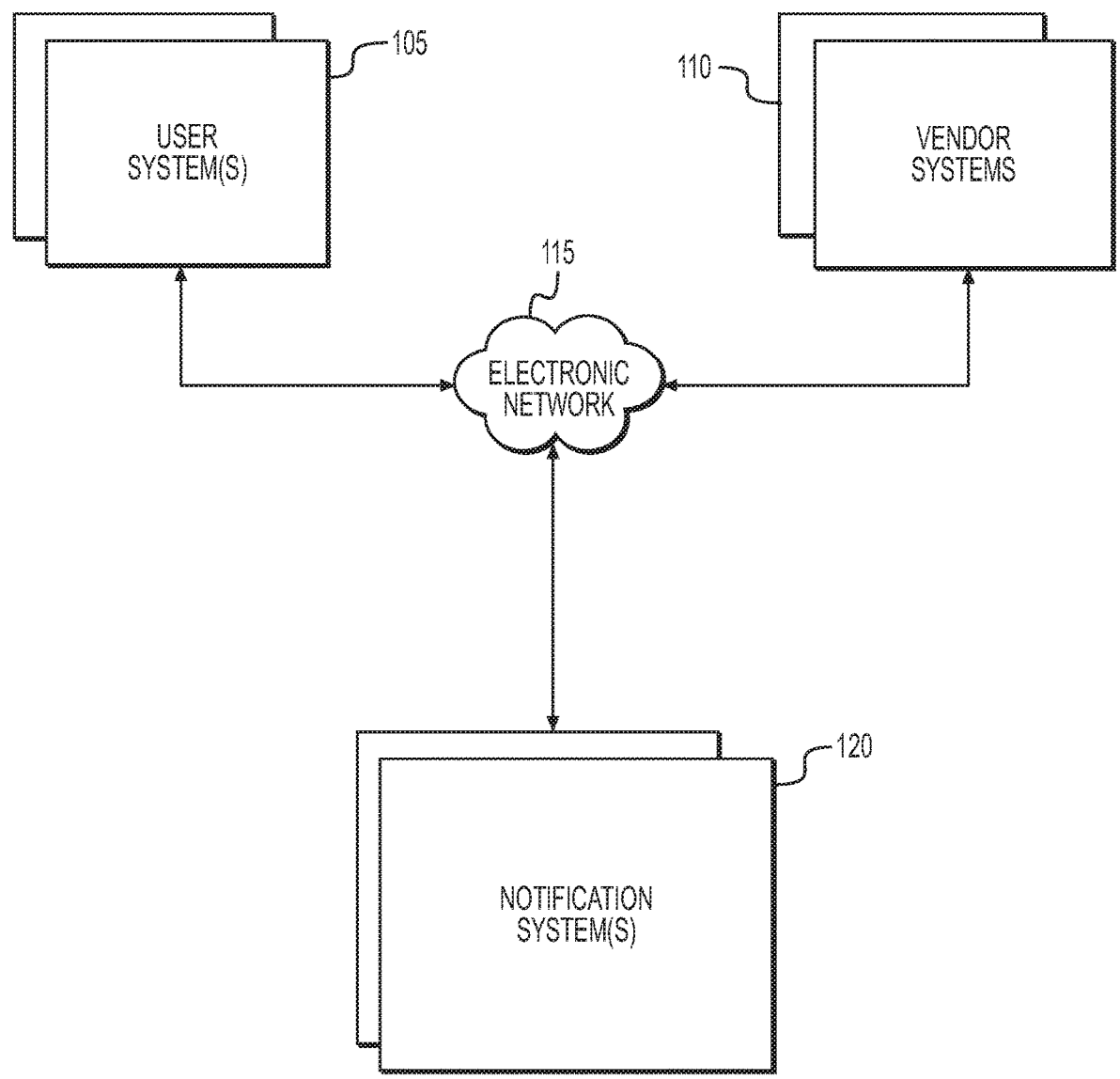
FIG. 1 depicts an exemplary client-server environment that may be utilized according to aspects of the present disclosure.

The terminology used in this disclosure is to be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially," "approximately," "about," and "generally," are used to indicate a possible variation of ±10% of a stated or understood value.

In this disclosure, the term "computer system" generally encompasses any device or combination of devices, each device having at least one processor that executes instructions from a memory medium. Additionally, a computer system may be included as a part of another computer system. As used herein, the term "dealer" may indicate, and may be used interchangeably with, a seller of items or services, a vendor of items or services, etc. The term "client" may indicate, and may be used interchangeably with, a user, a customer, a potential customer, buyer, person attempting to obtain a lease, ownership, ownership share, etc., of an item and/or service. The term "product" as used herein may refer to goods, services, property, rights, other things of value that may be transferred, or combinations thereof. The term "offer" generally encompasses information indicating an availability of a product for sale and/or information enabling a customer to purchase said product.

In general, the present disclosure provides methods and systems for generating and/or providing users with notifications for potential transaction rewards that may be redeemed by fulfilling a transaction with a particular vendor, and relates particularly to providing notifications of transaction rewards to the user based on user activity. As will be discussed below in more detail, in methods and systems according to the present disclosure, existing techniques may be improved.

Although transaction rewards are a tool used to incentivize a customer to select a particular transaction servicer and/or a particular vendor, customers may not be aware of potential rewards when making purchasing decisions. As a result, the potential benefit of added value for the customer from the reward, the added business for the vendor and/or transaction servicer associated with the reward, and/or the good will of the customer for the transaction servicer resulting from such a reward may be lost. While techniques have been developed to address such issues, e.g., providing updates on available rewards to information sources such as website pages, electronic mail messages, or the like, a potential customer may not consult or be aware of such information sources when making a purchasing decision. Furthermore, techniques that may be more persistent in updating the customer run the risk of oversaturation, whereby the customer may ignore or disable the system(s) providing the updates.

Accordingly, a need exists to improve the provision of notifications to a user of potential transaction awards when the user is making a purchasing decision. A need also exists to improve the provision of reward information without oversaturating the user. As discussed below, various aspects of existing technologies may be improved.

In one aspect, this disclosure pertains to systems and methods for determining a transaction intention of a user, and providing a notification of a transaction reward to the user that corresponds to the determined transaction intention. In another aspect, this disclosure pertains to transaction rewards that are associated with various categories of transactions, and to providing a notification of a transaction reward for a category of a transaction which the user is intending to make at a time when the user is making a purchasing decision. As used herein a "transaction intention" generally encompasses an intention of a user to make a transaction and/or purchase a particular product or type of product, as well as an intention of the user to browse for a particular product or type of product while making a purchasing decision, e.g., whether or not to make a purchase, which product to purchase, and/or which vendor to engage with in a transaction. A "category" for a transaction intention generally encompasses an intention to execute a transaction for a particular product or a particular type of product, a transaction with a particular vendor or a particular type of vendor, or a particular type of transaction. Transaction types may include a purchase, rental, lease, subscription, custom order, request, solicitation, or any other acceptable type of sale or transfer between entities.

In an exemplary use case, a first electronic application that provides an electronic shopping platform, such as a web browser, a shopping application, or the like, is installed or implemented on a user system 105 associated with a user. A second electronic application, such as reward notification application or a reward notification browser extension, is installed in or integrated into the first electronic application, and monitors the user's activity with the first electronic application. The second electronic application determines that the user has a transaction intention associated with a particular category of transaction by detecting whether a predetermined trigger condition for that particular category has been satisfied by the user's actions on the first electronic application. For example, the second application detects that the user, via the first electronic application, visits a website page associated with purchasing shoes, and thus determines that the user has a transaction intention in the category of shoes. In response to the determination, the notification application retrieves transaction award information associated with transaction rewards available for shoe purchase transactions, and causes the user system 105 to display a notification that includes the alternative offer information.

In this manner, the user may be provided with alternative offer information pertinent to their current transaction intention, and at a time when they are still in the process of making a purchasing decision. The user may then capitalize on the notification by redeeming the available transaction reward, which may benefit not only the vendor associated with the reward, but also the transaction servicer associated with the notification application. The use case above is exemplary only, and additional aspects of the disclosure are discussed below.

FIG. 1 depicts an exemplary client-server environment that may be utilized with techniques presented herein. One or more user system(s) 105 and/or one or more vendor system(s) 110 may communicate with each other and/or other systems across an electronic network 115. The systems of FIG. 1 may communicate in any arrangement. The user system 105 may be associated with a user or customer, e.g., a user seeking to browse for or purchase a product. As will be discussed herein, one or more notification system(s) 120 may communicate with the user system 105 and/or the vendor system 110 over the electronic network 115 in order to promote transaction reward notifications. In various embodiments, the notification system 120 may employ one or more machine learning models in order to analyze user actions, determine a transaction intention of the user, and/or identify transaction rewards associated with the transaction intention of the user. As used herein, a "machine learning model" may include data (e.g., product data, offer data, incentive data, vendor data, or historical customer data) or instruction(s) for generating, retrieving, and/or analyzing such data.

In various embodiments, the electronic network 115 may be a wide area network ("WAN"), a local area network ("LAN"), personal area network ("PAN"), or the like. In some embodiments, electronic network 115 includes the Internet, and information and data provided between various systems occurs online. "Online" may mean connecting to or accessing source data or information from a location remote from other devices or networks coupled to the internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web").

While FIG. 1 depicts the various systems as physically separate and communicating across network 115, in various embodiments features of certain systems, such as the notification system 120, may be incorporated partially or completely into any of the other systems of FIG. 1. For example, the notification system 120 and/or vendor system 110 may include a marketing platform, an e-commerce application, and/or a website page that may be accessible via the electronic network 115 on the vendor system 110 and/or the user system 105. Some or all of the functionality of one or more machine learning models included in the notification system 120 may be incorporated into the user system 105, the vendor system 110, or another system.

Figure 2:
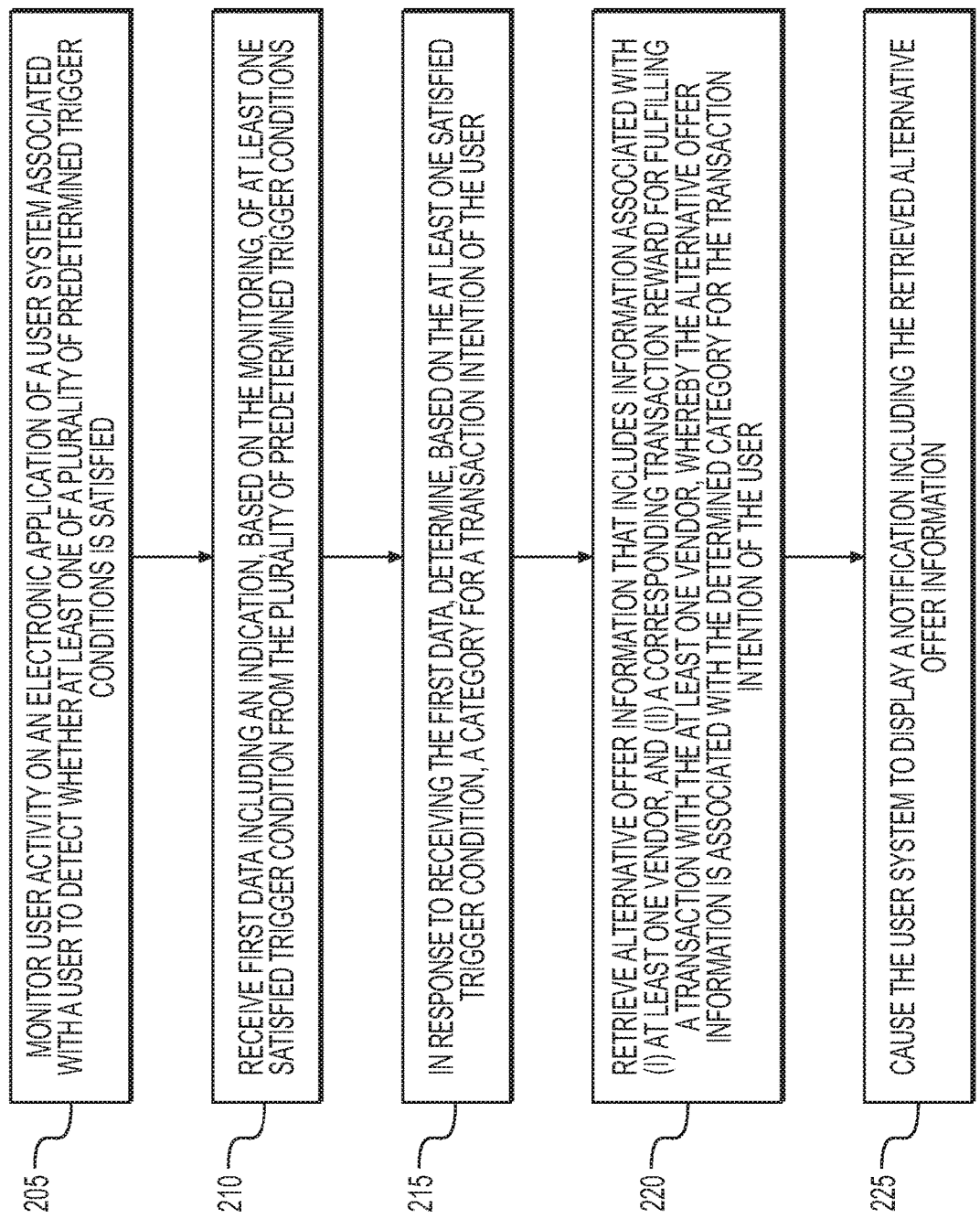
FIG. 2 depicts an exemplary process for generating and/or providing a transaction reward notification to a user.

FIG. 2 illustrates an exemplary process for generating and/or providing a transaction reward notification to a user.

At step 205, the notification system 120 may monitor user activity on an electronic application of a user system 105 associated with a user to detect whether at least one of a plurality of predetermined trigger conditions is satisfied. At step 210, the notification system 120 may receive first data including an indication, based on the monitoring of the user activity, of at least one satisfied trigger condition from the plurality of predetermined trigger conditions. At step 215, in response to receiving the first data with the indication of at least one satisfied trigger condition, the notification system 120 may determine, based on the at least one satisfied trigger condition, a category for a transaction intention of the user. At step 220, the notification system 120 may retrieve alternative offer information. The alternative offer information may be associated with the determined category for the transaction intention of the user, and may include, for example, information associated with (i) at least one vendor, and (ii) a corresponding transaction reward for fulfilling a transaction with the at least one vendor. At step 225, the notification system 120 may cause the user system 105 to display a notification including the retrieved alternative offer information. Each of these steps is discussed in further detail below.

With regard to step 205, in some embodiments, the monitoring may be performed by a portion of the notification system 120 integrated into or installed on the user system 105, e.g., a browser extension, an electronic application, or the like. A "browser extension" generally encompasses a program or application that is integrated into or operates in conjunction with an electronic application such as a web browser that enables the user to access website pages on the Internet. In an exemplary use case, the user is using a web browser application on the user system 105 to visit a website page such as an e-commerce site. The browser extension of the notification system 120 is integrated into the web browser, and monitors the user's activity as they use the web browser.

In another exemplary use case, the user is using an e-commerce application on the user system 105 to view products for sale. The notification system 120 includes a notification application that is integrated into or operates in conjunction with the e-commerce application, and monitors the user's activity as they use the e-commerce application. In some embodiments, the notification application is integrated into the user system 105, and monitors the user's activity irrespective of a particular program or application being used on the user system 105.

In various embodiments, various aspects associated with the user's activity may be monitored. Such aspects may include, for example, a Universal Resource Locater ("URL") associated with a website page visited by the user, data or metadata associated with the website page (cached data, cookies, images, preferences, etc.), a transaction platform included on the website page, a search query submitted by the user on the website page or on a search engine, content included on the website page (search results, product information, price listings, offers for sale, etc.), user interaction with the website page (items viewed or selected, options picked, etc.), or the like. In some embodiments, various aspects of the user's activity may be stored and/or accessible in data associated with a web session. Such web session data may be included in the monitoring.

In some embodiments, aspects that may be monitored may include, for example, content or metadata associated with the electronic application, requests for data made by the electronic application, data received by the electronic application, user interactions with the electronic application, or the like. In some embodiments, the electronic application includes functions or aspects that are similar to functions or aspects of a web browser. For example, some electronic applications may access and/or display data by accessing URLs or similar locaters. Similar aspects as the above may be monitored for such electronic applications. Other data associated with an electronic application may also be monitored.

The plurality of predetermined trigger conditions may include any number of trigger conditions, and any acceptable trigger condition may be used. Each trigger condition may be associated with a respective category of a transaction intention of the user. It should be understood that multiple trigger conditions may be associated with a same category, and that each trigger condition may have one or more respective criteria to be met in order to be satisfied. Data associated with such trigger conditions and/or criteria associated with such trigger conditions may be stored on a memory accessible to the notification system 120, the user system 105, and/or another system. In various embodiments, the plurality of trigger conditions may be obtained or retrieved from any acceptable source.

In some embodiments, a trigger condition may include a criterion that a website page visited by the user, e.g., via the web browser on the user system 105, corresponding to a website page in a predetermined list of website pages. Each website page in the predetermined list of website pages may be associated with at least one category of the transaction intention of the user. For example, the predetermined list of website pages may include a website page with the URL "exampleshoes.com" that is associated with the user transaction intention category of shoes. In some embodiments, the association between the website page and the category of the user transaction intention may be entered manually, e.g., by a user of the notification system 120 or of a vendor system 110 associated with the website page. In some embodiments, the association may be determined by employing a machine learning model and/or an algorithm that, for example, may parse the URL of the website page and/or contents of the website page or other associated data.

In an exemplary use case, a user visits the website page with the URL "exampleshoes.com." The notification system 120 monitors the URL of the website page, and determines that the URL matches the URL of the website page on the predetermined list of website pages (step 205). Such determination satisfies the criterion for a particular trigger condition, and thus the notification system 120 generates the first data with an indication that the particular trigger has been satisfied (step 210). As discussed in further detail below, the notification system 120 may then determine the category associated with the particular trigger condition, and proceed to generate a corresponding notification.

In some embodiments a criteria for a trigger condition may include a criterion that a search query submitted by the user and received by the user system 105 (e.g., received by a search engine in the web browser, on a website page, on the electronic application, or the like) corresponds to at least one transaction intention category. In some embodiments, the notification system 120 may compare the search query to a predetermined list of keywords, whereby each keyword is associated with a respective category. In some embodiments, the notification system 120 may employ a machine learning model and/or algorithm to perform a language processing analysis on the search query to determine the corresponding category. Any acceptable language processing analysis may be used, e.g., natural language processing, word clustering, semantic analysis, or the like.

In some embodiments a criteria for a trigger condition may include a criterion that content included in the website page visited by the user and/or the electronic application corresponds to at least one transaction interaction category. In some embodiments, the notification system 120 may search such contents for one or more keywords in the predetermined list of keywords. In some embodiments, the notification system 120 may search the contents for predetermined arrangements of data or information. For example, e-commerce stores may arrange offers for sale in a list or grid that includes an image of a product, a price, and/or a description of the product in a regular format. The notification system 120 may be configured to identify such arrangement to determine that the user is viewing a selection of products for sale. In some embodiments, the notification system 120 may employ a machine learning model, algorithm, or any other acceptable process to perform an analysis on the contents to determine the corresponding category.

In some embodiments a criteria for a trigger condition may include a criterion that a transaction platform included in the website page and/or electronic application corresponds to at least one transaction intention category. For example, a presence of a transaction platform (e.g., a shopping cart, a payment portal, an order form, etc.) may be indicative of a differentiation between a source of information associated with a product from an e-commerce platform offering the product for sale, and thus may be associated with the transaction intention of the user. In some embodiments, the transaction platform and/or data or metadata associated with the transaction platform may include information associated with a type of transaction that may be fulfilled via the transaction platform, which may correspond to the transaction intention of the user.

In some embodiments a criteria for a trigger condition may include a criterion that a user interaction with the website page is indicative of at least one transaction intention category. A user interaction may include, for example, viewing a particular portion of content, selecting an item on the website page (a URL, an image, a button, an option, text, etc.), pre-selecting an item (e.g., via a mouse hover or using any other acceptable interaction device such as a long press on a touch screen, or the like), or other actions like bookmarking or favorite-ing the website page, sharing the website page with a contact of the user (e.g., via textual message, email, the electronic application, or the like), etc.

With regard to step 215, in some embodiments, the category for the transaction intention of the user may be determined based on the trigger condition that has been satisfied, and thus based on the criteria associated with the trigger condition that have been met. For example, in an exemplary embodiment, a trigger condition includes the criterion that a website page visited by the user matches the URL "exampleshoes.com," whereby such URL is associated with the category of shoe purchase transaction in the predetermined list of websites. Based on such criterion being met, satisfaction of the trigger condition is indicative of the category of the transaction intention of the user being for a shoe purchase.

However, in some embodiments, a particular criterion in a trigger condition may be associated with more than one category. For example, an e-commerce website may offer different products or types of products for sale, or may offer products via different types of transactions such as purchase, lease, rental, reservation, ticketing, subscription, customized order, etc. Thus, the website page for the e-commerce platform, the content on the website page, or the like may be associated with more than one category of transaction intention. A search query may include different keywords that each correspond to a different category, or a particular keyword may correspond to multiple categories.

Thus, in some embodiments, a trigger condition that includes a criterion that may correspond to more than one category of transaction intention may include at least one additional criterion. Additional criteria may be used to disambiguate which of the multiple categories associated with a criterion may correspond with the user's transaction intention. For example, in an exemplary use case, the user may visit an e-commerce website that offers a plurality of different products segmented into groups, e.g., books, movies, games, etc. The visit may thus satisfy a first criterion that the visited website matches a website on the predetermined list of websites. In the predetermined list, the website page may be associated with a plurality of categories of transaction intentions, e.g., a book purchase, a movie purchase or rental, a game purchase or rental, etc. The user may select a button or tab or URL link associated with the category of books, and such act may satisfy a second criterion that the user's action is indicative of the category of a book purchase. Meeting of the first and second criteria results in a trigger condition being satisfied, and, based on the criteria associated with the trigger condition, the notification system 120 may determine that the category for the transaction intention of the user is a book purchase.

In some embodiments, trigger conditions may be determined dynamically, e.g., based on one or more criteria being met in conjunction with a purchase decision from the user. For example, in some embodiments, the notification system 120 may deploy a machine learning model and/or an algorithm that determines, based on one or more criteria being met, whether the met criteria are indicative of a particular category of transaction intention. In some embodiments, a record of met criteria along with a purchase made by the user via the user system 105 may be used to train the machine learning model for future determinations. For example, the machine learning model may be configured to learn associations between various criteria and categories of transaction intentions in order to determine trigger conditions for each category.

In some embodiments, the notification system 120 may determine, based on one or more met criteria, that the user has a transaction intention, e.g., is contemplating a purchase decision, but may not have sufficient information to narrow down the user's transaction intention to a single category with perfect confidence. For example, in some embodiments, a criterion that may correspond to multiple categories may include weights for the association of the criterion to each category. In an example, a criterion may include that a search query includes the word "apple," and includes a 30% weight that the user has a transaction intention to purchase fruit, and a 70% weight that the user has a transaction intention to purchase a technology product. In various embodiments, the notification system 120 may select a highest weighted category, combine weights from multiple criteria, only consider the criterion met with a weight above a predetermined threshold, or the like. In some embodiments, the machine learning model may incorporate such weights when determining the category of the user's transaction intention.

In some embodiments, along with determining the category of the user's transaction intention, the notification system 120 may identify that the user's transaction intention pertains to a particular product. For example, in some embodiments, the notification system may identify a particular product based on the information monitored in step 205. In an exemplary use case, a user may visit the e-commerce store website page "exampleshoes.com" to buy a pair of "Example Shoes." The notification system 120 may determine that the user has a transaction intention of buying shoes, and in particular of buying a pair of "Example Shoes." In some embodiments, the notification system 120 utilizes a product comparison system, product identification system, or the like to identify the particular product. In an exemplary embodiment, the notification system 120 provides information monitored during the monitoring at step 205, and receives an identification of at least one vendor and/or offer for the particular product.

With regard to step 220, in various embodiments, the notification system 120 may retrieve the alternative offer information from any acceptable source such as, for example, a memory accessible to the notification system 120, a database, the vendor system 110, or the like. In some embodiments, the notification system 120 may retrieve the alternative offer information from a reward system, or the like. In some embodiments, the notification system 120 may transmit a request based on the determined category for the transaction intention of the user. In some embodiments, the database may include alternative offer information associated with each category.

Information associated with a vendor may include, for example, a vendor name, description, one or more products offered for sale by the vendor, location, delivery or shipping information, or the like. Information associated with a corresponding transaction reward for fulfilling a transaction with the at least one vendor may include, for example, a type for the reward, a magnitude of the reward, a time window of availability of the reward, a predicted value to the user of the reward, or the like. Any acceptable type of reward may be used such as, for example, a cash-back percentage of the transaction, a predetermined cash-back amount, a quantity of membership points, a multiplier or bonus for a type of reward, or the like. For example, in an exemplary use case a credit card transaction servicer may generally offer 1% cash back for each purchase, but may offer a reward of 5% cash back for purchases from a particular vendor. In another exemplary use case, the credit card transaction servicer may offer a bonus of 100 extra membership points for a purchase from a particular vendor.

In some embodiments, the notification system 120 is configured to retrieve alternative offer information pertaining to a specific product corresponding to the determined transaction intention category. In some embodiments, the specific product is selected by a corresponding vendor. In some embodiments, the specific product is the product that the user has a particular transaction intention to purchase. For example, in some embodiments, when the user has a particular transaction intention to purchase a particular product, e.g. a pair of "Example Shoes," the alternative offer information may include information for at least one vendor that offers such particular product. In some embodiments, the notification system 120 utilizes a product comparison system, product identification system, or the like to identify offers that include such particular product. In an exemplary embodiment, the notification system 120 provides an identification of the particular product and/or information monitored during the monitoring at step 205, and receives an identification of at least one vendor and/or offer for the particular product.

In some embodiments, prior to the displaying of the notification on the user system 105 (step 225), the notification system 120 may determine a value to the user of the transaction reward associated with the at least one vendor. In some embodiments, the value to the user may be determined based on the magnitude of the transaction reward. For example, if the magnitude of the transaction reward is a quantity of membership points or a predetermined amount of cash back, then the value may be determined based on an equivalent monetary value to the magnitude. In some embodiments, the value to the user may be determined based on historical information associated with the user and/or the vendor. Historical user information may include, for example, an average transaction balance of the user for one or more of a particular vendor, a particular category of transaction, a particular product offered by the particular vendor, previous transaction of the user, etc. Historical vendor information may include, for example, average purchase price of a transaction fulfilled by the vendor, information associated with products for sale or sold by the vendor, or the like. In an exemplary use case, the notification system 120 may determine the value of the respective transaction reward associated with a vendor based on the average price of previous transactions between the user and the vendor, and on the magnitude of the transaction reward associated with the vendor.

In some embodiments, historical information includes information associated with rewards programs or memberships enrolled in by the user and/or offered by the at least one vendor. For example, in an exemplary use case, a user may be using ESTORE1 and the alternative offer information may include information that the user may be able to use a membership program in a transaction with ESTORE2 instead. In some embodiments, the value to the user may be based on a discount or reward value of the membership program available at an alternative vendor. In some embodiments, the notification system 120 is configured to retrieve historical information from, for example, a payment mechanism system, a product comparison system, or the like.

In some embodiments, the value to the user is based on the price of a particular product that is the subject of the particular transaction intention of the user. For example, in some embodiments, transaction rewards for a transaction are based on the purchase price of the transaction, and thus the purchase price is usable to determine a value of the transaction reward. In an exemplary use case, a pair of "Example Shoes" may cost $60, and the transaction reward for such a purchase at ESTORE2 may be 10% cash back, such that the reward value to the user is $6. In another exemplary use case, a pair of "Example Shoes" may cost $60 at ESTORE1 and $70 at ESTORE2, but ESTORE2 includes a transaction reward worth $20, such that the net purchase price at ESTORE2 is $50 and the value to the user is $10.

In some embodiments, the displaying of the notification on the user system 105 may be performed in response, or only in response, to a determination that the determined value of the transaction reward to the user is above a threshold value. For example, in an embodiment where the threshold value is $10 US, and the determined value of a particular transaction reward to the user from a particular vendor is $8, the notification system 120 may not display a notification including alternative offer information pertaining to the particular vendor or transaction reward.

In some embodiments, the notification system 120 may determine, based on the historical user information, that the user has previously fulfilled a transaction in the same determined category with the particular vendor and/or that the user has exhibited a trend or pattern of making purchases from the particular vendor of transactions in the determined category. The notification system 120 may display a notification including alternative offer information pertaining to the particular vendor or transaction reward. In some embodiments, the notification may include a message referencing the user's previous transaction(s), e.g., "You usually shop at exampleshoes.com. Don't miss out on 3% cash back!"

In some embodiments, the threshold value may be predetermined, e.g., via manual entry from the user, an entity associated with the notification system 120, etc. In some embodiments, the threshold may be determined based on the historical information associated with the user. For instance, the notification system 120 may determine, based on the historical information, that the user may be more likely to engage with a notification including a transaction reward with a value at or above a particular amount. Such determination may pertain to a particular vendor, a particular category of transaction intention, or to transactions or vendors in general. In some embodiments, the threshold value may be determined based on a notification display value of the user system 105 relative to a notification display threshold, as discussed in further detail below. In some embodiments, the threshold value may be determined based on information associated with one or more previous notifications displayed on the user system 105. For example, in an exemplary use case, a user did not engage with a previous notification including a transaction reward for a particular vendor with a first magnitude, and the notification system 120 may determine the threshold value for a subsequent notification based on the value of the transaction reward in the previous notification. In some embodiments, the notification system 120 may employ a machine learning model or algorithm to determine the threshold value, e.g., based on information such as the foregoing.

With regard to step 225, as noted above, the notification to be displayed by the user system 105 may include the retrieved alternative offer information. In some embodiments, the notification may further include the determined category of the user's transaction intention. In some embodiments, the notification may include a selectable button, link, icon, or the like that, when selected by the user, is configured to cause the notification system 120 to activate the transaction reward and/or transmit a request to a reward system, transaction servicer system, or the like, to activate the reward. In various embodiments, the notification may be displayed as a system notification of an operating system of the user system 105, as a popup window or the like of the web browser, as an insertion into the website page or electronic application, as a text message or electronic message, or any other acceptable technique for providing and displaying a notification on a computer system.

In some embodiments, the retrieved information may include a plurality of vendors associated with the determined category. In some embodiments, the notification may include information associated with each of the plurality of vendors and information associated with a respective transaction reward for fulfilling a transaction with each vendor. In some embodiments, the notification system 120 may include information associated with a selection from the plurality of vendors associated with the determined category and associated with the respective transaction reward for fulfilling the transaction with each selected vendor.

In some embodiments, the selection from the plurality of vendors may be a random selection. As used herein, the term "random" generally encompasses pseudorandom selections, or the like. In some embodiments, the selection is based on one or more previous notifications displayed by the user system 105. For example, in an exemplary embodiment, a vendor included in a previous notification is not selected in a next succeeding notification. In some embodiments, the selection is based on the respective transaction rewards of the plurality of vendors. For example, in an exemplary embodiment, a first vendor associated with a relatively smaller transaction reward is not selected in favor of a second vendor associated with a relatively larger transaction reward. In various embodiments, the selection may be based on, for example, a predetermined threshold for the respective transaction reward, or the like. In some embodiments, the selection may be based on a ranking assigned to the plurality of vendors. For example, the notification may include a predetermined top number of the plurality of vendors based on the assigned ranking.

In various embodiments, the ranking may be assigned based on, for example, the respective transaction rewards of the plurality of vendors, estimated values to the user for executing a transaction with the plurality of vendors, a priority ranking assigned to one or more of the plurality of vendors, a time window of availability for the respective transaction rewards, a correlation, e.g., (based on the weights discussed above) between the plurality of vendors and the determined transaction intention of the user, or the like. In some embodiments, a priority ranking for a vendor may be assigned based on, for example, a promotion agreement with a vendor. For instance, in an exemplary embodiment, a particular vendor may have a promotion agreement with an entity associated with the notification system 120, and the notification system 120 may prioritize inclusion of the particular vendor over other vendors that do not have a promotion agreement and/or take the promotion agreement into account when assigning ranks. In some embodiments, scores are assigned to vendors for various aspects (e.g., promotion agreement, transaction reward, time window remaining), and ranks are assigned based on an aggregation of such scores for each vendor.

In some embodiments, the user system 105 and/or the notification system 120 may track, e.g., via the browser extension, electronic application, or the like, a notification display value of the user system 105 relative to a notification display threshold. In some embodiments, the notification display value may be indicative of one or more of a frequency of the display of notifications on the user system 105, a period of time since the display of a previous notification, a quantity of notifications previously displayed on the user system 105, a notification saturation level of the user, a quantity of vendors that have been included in a notification from amongst a plurality of vendors corresponding to the determined category, or the like. In some embodiments, the notification display threshold may correspond to an amount of notifications displayed beyond which the user may be less likely to engage with a subsequent notification, the total number of vendors in the plurality of vendors corresponding to the determined category, or the like.

For instance, in an exemplary use case, the notification display threshold is determined based on the number of vendors in the plurality of vendors associated with the determined category of the user's transaction intention. An increase in the display notification value may thus be indicative that more of the vendors from the plurality of vendors have already been included in a notification displayed by the user system 105. When most or all of the plurality of vendors have been displayed in a notification, the notification system 120 may thus not display a further notification including one of the vendors in the plurality of vendors. In this manner, the notification system 120 may avoid repetitious notifications, and thus avoid oversaturating the user.

In some embodiments, the notification display threshold may be predetermined, e.g., via a manual setting from the user and/or the entity associated with the notification system 120, etc. In some embodiments, the notification system 120 may determine the notification display threshold based on the historical information associated with the user. For instance, in an exemplary embodiment, the notification system 120 may determine that the user may be less likely to engage with a notification if the notification has been displayed within 5 minutes of a previous notification, or if more than 3 notifications were displayed within an hour. In some embodiments, the notification system 120 may employ a machine learning model or algorithm to determine the notification display threshold.

In some embodiments, the notification system 120 may only base the notification display value on notifications that were displayed by the user system 105 for at least a threshold period of time. For example, the notification system 120 may not increase the notification display value after displaying a previous notification if the previous notification was only displayed for less than a second, e.g., due to the web browser or electronic application closing or being redirected to another website page, or the like. In various embodiments, the threshold period of time may be predetermined, determined based on the historical information associated with the user, and/or determined via a machine learning model or algorithm. In some embodiments, an increase to the notification display value for a particular notification may be based on a period of time for which the particular notification was displayed.

In some embodiments, the increase to the notification display value for a particular notification may be based on the value to the user of a transaction reward included in the notification. For example, in some embodiments, a notification that includes a transaction reward with a relatively higher value to the user may saturate the user relatively less than a notification that includes a transaction reward with a relatively lower value to the user. In some embodiments, the notification system 120 may ignore the notification display threshold in response to the value to the user of a transaction reward in a subsequent notification being above a predetermined threshold value to the user.

In some embodiments, in response to the notification display value meeting or exceeding the notification display threshold, the user system 105 and/or the notification system 120 may generate second data including an indication that the notification display value has met or exceeded the notification display threshold. In some embodiments, in response to receiving the second data, the notification system 120 is configured to cause the monitoring of the user activity to at least temporarily cease.

In an exemplary use case, the notification display threshold may be indicative of a saturation threshold of the user, and thus the notification display value reaching the notification display threshold may be indicative that the user has become saturated with regard to notifications, and thus may be less likely to engage with a notification and/or tolerant of continued notifications from the notification system 120. A pause and/or cessation of the display of notifications on the user system 105 may allow the user to avoid becoming saturated by notifications and/or recover from being saturated.

In some embodiments, the notification system 120 may reset the notification display value after a predetermined period of time. In various embodiments, such predetermined period of time may be predetermined, e.g., via a manual entry received from the user and/or the entity associated with the notification system 120, or may be determined based on the historical information for the user, e.g., via a machine learning model or algorithm. In some embodiments, the notification system 120 may gradually and/or incrementally decrease the notification display value toward zero over time.

In some embodiments, the notification system 120 may reduce, reset, or ignore the notification display value in response to an instruction received form the user via the user system 105. For example, in an exemplary use case, the user may visit an e-commerce website page when making a purchasing decision, and may desire to know whether a different e-commerce website page may provide a more beneficial transaction reward. In some embodiments, the user may select a button, link, icon, or the like configured to cause the user system 105 to issue a request to the notification system 120, e.g., via the browser extension, electronic application, etc., to generate a notification pertaining to the user's visit to the first e-commerce website page. In response, the notification system 120 may proceed based on the method discussed above, and may ignore, reset, or reduce the notification display value to ensure that a notification, if generated, is displayed on the user system 105.

Figure 3A:
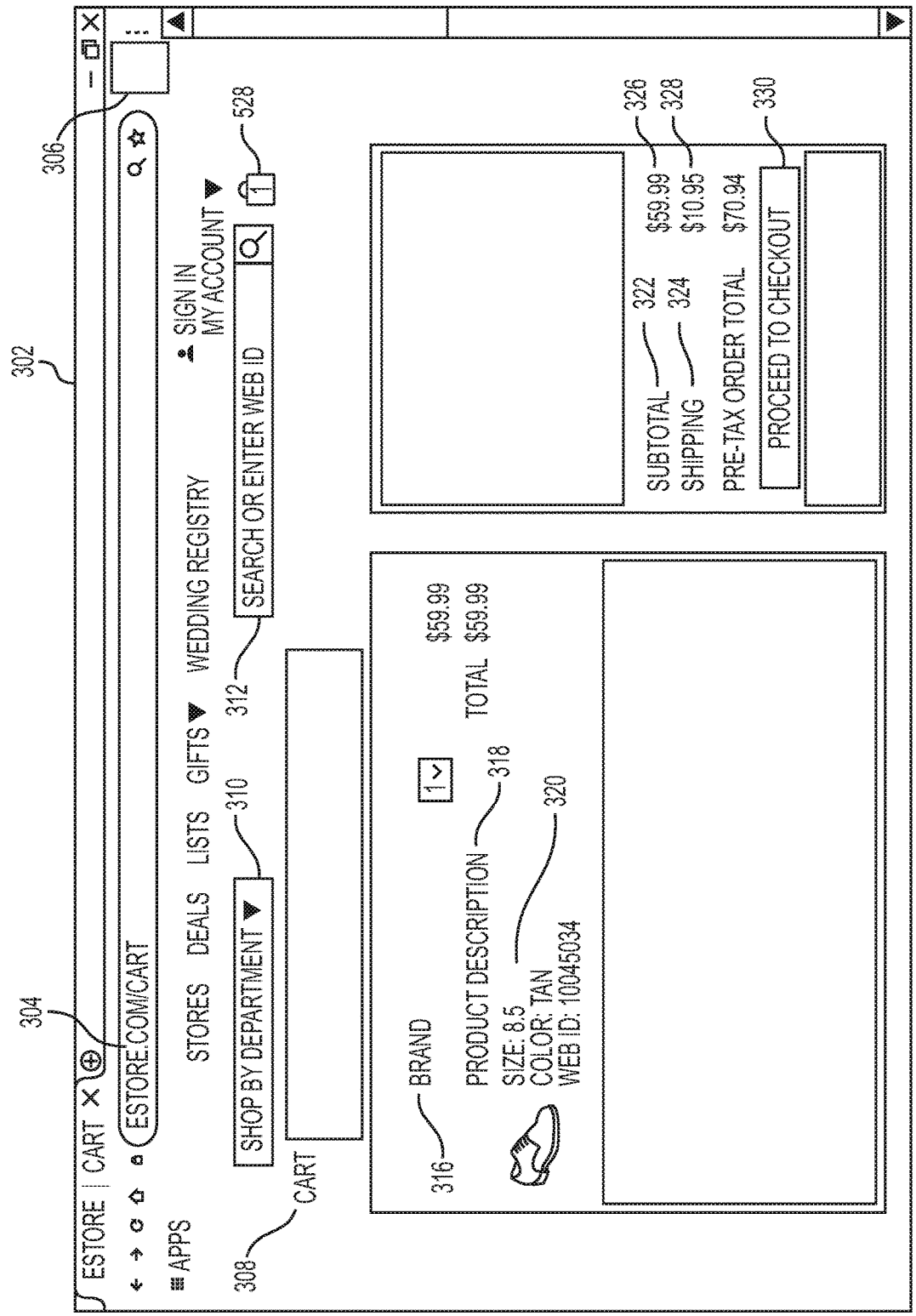
FIG. 3A depicts an exemplary embodiment of a view of a user interface of a computer system accessing an e-commerce website.

In an exemplary use case, a user is using a user device 105 to visit an e-commerce website page ESTORE.com to purchase shoes. FIG. 3A depicts an exemplary embodiment of a view 302 of the ESTORE.com website page, in particular a shopping cart page that includes a pair of shoes added to a shopping cart for the website page by the user. The notification system 120, e.g., via a monitoring application installed on the user device 105, may monitor a web session of the user. For example, the notification system may monitor various aspects of the website page such as a URL 304 for the website page, as well as content on the website page. Website page content monitored by the notification system may include, for example, a heading or title 308 for the current website page, a tab setting or label 310, a search input field 312, an icon 314 indicating a quantity of items in a shopping cart, a brand identifier 316 associated with a vendor, a product description 318, product information 320, labels associated with a transaction such as a subtotal label 322 and a shipping label 324 as well as associated costs 326 and 328, respectively, or a button 330 associated with completing a transaction.

Figure 3B:
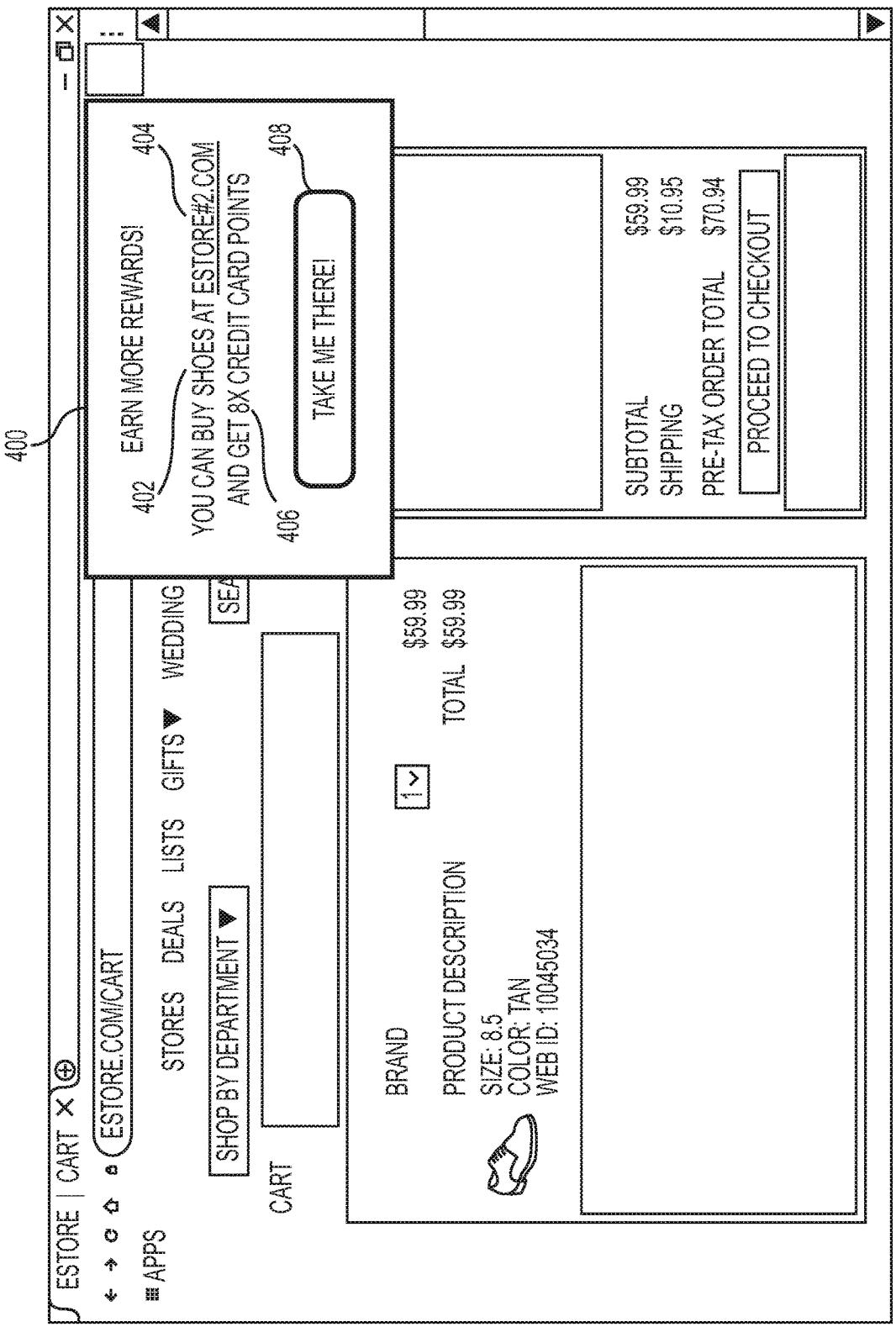
FIG. 3B depicts the view of the user interface of FIG. 3A along with an exemplary embodiment of a notification that includes alternative offer information.

Based on such information, the notification system 120 may determine that the user has a transaction intention associated with shoes. The notification system 120 may retrieve alternative offer information associated with the category of shoes, and may generate a notification that includes the alternative offer information. FIG. 3B depicts an exemplary embodiment of a notification 400 displayed in conjunction with the website page of FIG. 3A. The notification 400 includes a reference 402 to the determined category, e.g., "SHOES", information 404 associated with an alternative vendor, e.g., a URL link for "ESTORE #2.COM", a transaction reward, e.g., "8× CREDIT CARD POINTS", and a button 408 that is selectable by the user to access the URL 404.

Additional aspects of the disclosure are discussed in the additional exemplary embodiments below.

In an exemplary embodiment, a computer-implemented method of providing a notification for a transaction reward to a user may include: receiving first data including an indication of at least one satisfied trigger condition of a plurality of predetermined trigger conditions, the indication based on monitoring of user activity on a web browser of a user system 105 associated with the user; and in response to receiving the first data: determining, based on the at least one satisfied trigger condition, a category for a transaction intention of the user; retrieving alternative offer information associated with (i) at least one vendor and (ii) a transaction reward for fulfilling a transaction with the vendor, the transaction reward information associated with the category for the transaction intention of the user; and causing the user system 105 to display a notification including the transaction reward information.

In some embodiments, the method may further include receiving second data including an indication that a notification display value of the user system 105 has reached a notification display threshold; and in response to receiving the second data, causing the monitoring of the user activity to at least temporarily cease.

In some embodiments, the notification display value is based on a number of notifications that were each previously displayed by the user system 105 for at least a predetermined period of time.

In some embodiments: the notification display value is based on a number of vendors associated with the category of the transaction intention of the user that have been previously displayed by the user system 105; and the notification display threshold is based on a total number of vendors associated with the category of the transaction intention of the user.

In some embodiments, each trigger condition in the plurality of predetermined trigger conditions is satisfied based on a respective criteria, the respective criteria for each trigger condition including one or more of: a website page visited by the web browser on the user system 105 corresponding to a website page in a predetermined list of website pages, each website page in the predetermined list of website pages associated with at least one transaction intention category; a search query received via the web browser on the user system 105 corresponding to at least one transaction intention category; content included in the website page visited by the web browser corresponding to at least one transaction intention category; a transaction platform included in the website page visited by the web browser corresponds to at least one transaction intention category; or a user interaction with the website page visited by the web browser is indicative of at least one transaction intention category.

In some embodiments: a first criterion of the respective criteria is associated with a plurality of categories for the transaction intention of the user; and the respective criteria includes the first criterion, and at least one further criterion.

In some embodiments: a plurality of vendors are associated with the category for the transaction intention of the user; and the notification includes: information associated with each of the plurality of vendors associated with the category, and information associated with a respective transaction reward for fulfilling a transaction with each vendor; or information associated with a selection from the plurality of vendors associated with the category, and information associated with the respective transaction reward for fulfilling the transaction with each selected vendor.

In some embodiments, the selection from the plurality of vendors is based on one or more of: a random selection; the respective transaction rewards for the plurality of vendors; or a priority ranking assigned to one or more of the plurality of vendors.

In some embodiments, the method may further include, prior to causing the user system 105 to display the notification, determining a value of the transaction reward to the user, wherein the causing of the user system 105 to display the notification is performed in response to a determination that the value of the transaction reward to the user is above a threshold value.

In some embodiments: the value to the user is determined based on one or more of an average transaction value for transactions on a website page visited by a web browser on the user system 105, and a magnitude of the transaction reward; and the threshold value is based on one or more of a notification display value of the user system 105 relative to a notification display threshold, information associated with one or more previous notifications displayed by the user system 105, a user threshold value received from the user via the user system 105, or a predetermined value.

In a further exemplary embodiment, a computer-implemented method of providing a notification for a transaction reward to a user may include: monitoring user activity on an electronic application of a user system 105 associated with the user to detect whether at least one of a plurality of predetermined trigger conditions is satisfied; in response to an indication of at least one satisfied trigger condition from the plurality of predetermined trigger conditions: determining, based on the at least one satisfied trigger condition, a category for a transaction intention of the user; retrieving alternative offer information associated with the determined category for the transaction intention of the user and including information associated with (i) at least one vendor and (ii) a corresponding transaction reward for fulfilling a transaction with the at least one vendor; and displaying, on the user system 105, a notification including the retrieved alternative offer information.

Figure 4:
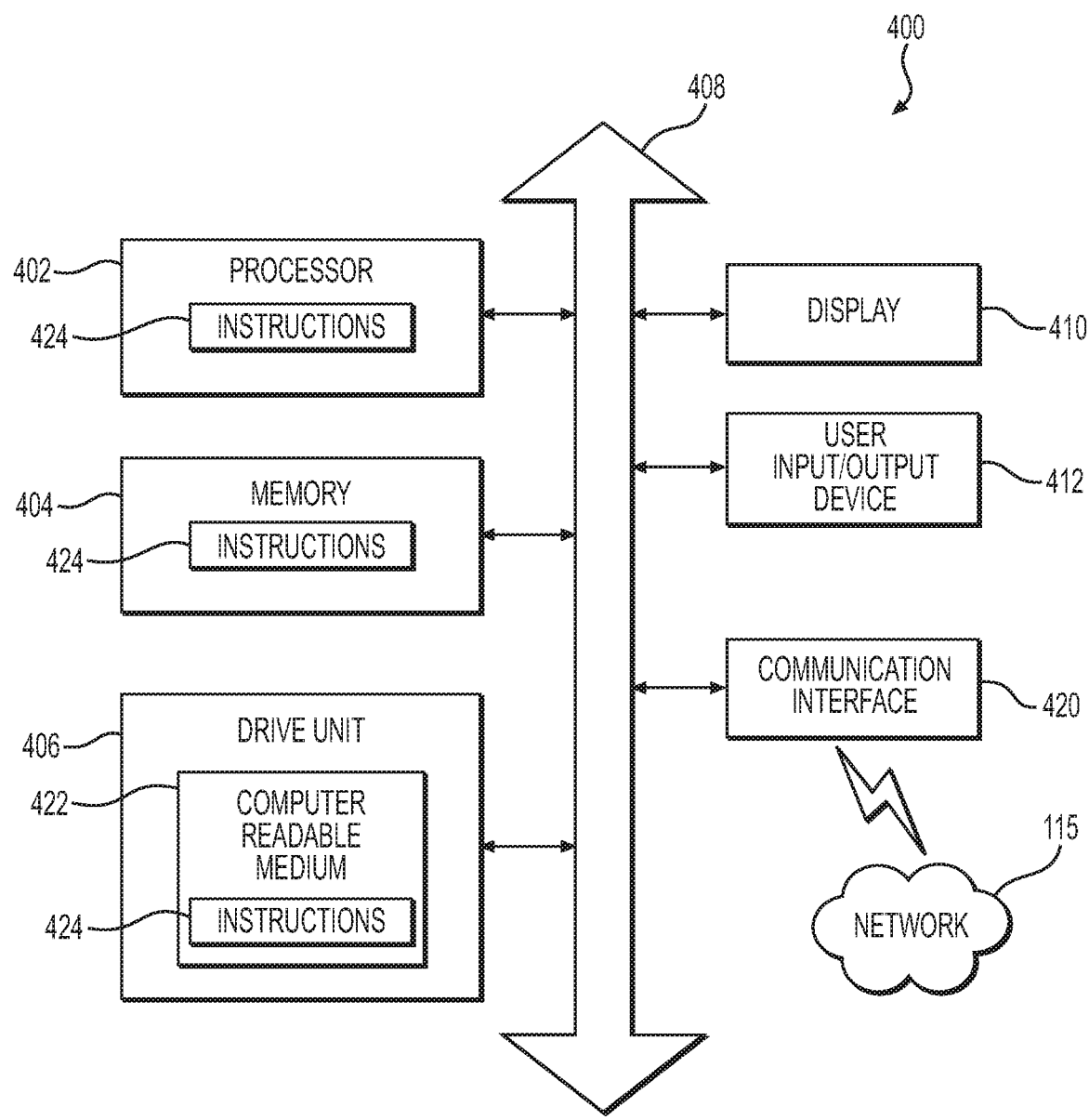
FIG. 4 depicts an example of a computing device, according to aspects of the present disclosure.

FIG. 4 is a simplified functional block diagram of a computer 400 that may be configured as a device for executing the method of FIG. 2, according to exemplary embodiments of the present disclosure. FIG. 4 is a simplified functional block diagram of a computer that may be configured as the notification system 120 according to exemplary embodiments of the present disclosure. Specifically, in one embodiment, any of the systems, servers, etc., discussed herein may be an assembly of hardware 400 including, for example, a data communication interface 420 for packet data communication. The platform also may include a central processing unit ("CPU") 402, in the form of one or more processors, for executing program instructions. The platform may include an internal communication bus 408, and a storage unit 406 (such as ROM, HDD, SDD, etc.) that may store data on a computer readable medium 422, although the system 400 may receive programming and data via network communications. The system 400 may also have a memory 404 (such as RAM) storing instructions 424 for executing techniques presented herein, although the instructions 424 may be stored temporarily or permanently within other modules of system 400 (e.g., processor 402 and/or computer readable medium 422). The system 400 also may include input and output ports 412 and/or a display 410 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

In general, any process discussed in this disclosure that is understood to be performable by a computer may be performed by one or more processors. Such processes include, but are not limited to: the processes shown in FIG. 2, and the associated language of the specification. The one or more processors may be configured to perform such processes by having access to instructions (computer-readable code) that, when executed by the one or more processors, cause the one or more processors to perform the processes. The one or more processors may be part of a computer system (e.g., one of the computer systems discussed above) that further includes a memory storing the instructions. The instructions also may be stored on a non-transitory computer-readable medium. The non-transitory computer-readable medium may be separate from any processor. Examples of non-transitory computer-readable media include solid-state memories, optical media, and magnetic media.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method of providing alternative offer information to a user during a period of time in which the user is making a purchasing decision, the computer-implemented method comprising:
   receiving, via a processor of a notification system, an indication that a web browser of a user system associated with the user is displaying a website page associated with a first vendor;
   determining, via the processor of the notification system, that the user associated with the user system has a transaction intention at the website page associated with the first vendor with regard to a category of products;
   in response to determining the transaction intention of the user with regard to the category of products:
      determining, via the processor of the notification system, a purchase price of a transaction corresponding to the transaction intention of the user with the first vendor;
      obtaining, via the processor of the notification system, alternative offer information by:
         retrieving (i) vendor information associated with at least one vendor other than the first vendor that is associated with the category of products corresponding to the transaction intention of the user, and (ii) historical information associated with one or more of a rewards program or a membership that one or more of the user or the at least one vendor is enrolled in;
      determining a transaction reward for fulfilling a transaction with the at least one vendor, based on the historical information; and
      determining a purchase price of a transaction corresponding to the transaction intention of the user with the at least one vendor based on the transaction reward and the vendor information;
   determining, via the processor of the notification system, a difference in price between the purchase price at the at least one vendor and the purchase price at the first vendor;
   determining, based on historical user information associated with the user, a threshold difference in price at which one or more of (i) the user is likely to engage with the alternative offer information, or (ii) the alternative offer information is unlikely to raise an offer saturation level of the user to a saturation threshold of the user; and
   determining, via the processor of the notification system, whether the difference in price exceeds the threshold difference in price; and
   only in response to determining that the difference in price is above the threshold difference in price, causing, via the processor of the notification system, the user system to display, as a popup window laid over the website page in the web browser, a notification including the alternative offer information, during the period of time in which the user is making the purchasing decision, wherein the notification further includes a selectable item configured to cause the user system to access a website page associated with the at least one vendor, such that no popup window is caused to be displayed by the processor of the notification system in response to the difference in price not exceeding the threshold difference in price.

2. The computer-implemented method of claim 1, further comprising:
   receiving first data including an indication that a notification display value of the user system is at or above a notification display threshold; and
   in response to receiving the first data, causing monitoring of the user system to at least temporarily cease.

3. The computer-implemented method of claim 2, wherein the notification display value is based on a number of notifications that were each previously displayed by the user system for at least a predetermined period of time.

4. The computer-implemented method of claim 2, wherein:
   the notification display value is based on a number of vendors associated with the category of the transaction intention of the user that have been previously displayed by the user system; and
   the notification display threshold is based on a total number of vendors associated with the category of the transaction intention of the user.

5. The computer-implemented method of claim 1, wherein:
   a plurality of vendors are associated with the category for the transaction intention of the user; and
   the notification includes:
      information associated with each of the plurality of vendors associated with the category, and information associated with a respective transaction reward for fulfilling a transaction with each vendor; or
      information associated with a selection from the plurality of vendors associated with the category, and information associated with the respective transaction reward for fulfilling the transaction with each selected vendor.

6. The computer-implemented method of claim 5, wherein the selection from the plurality of vendors associated with the category is based on one or more of: a random selection; respective transaction rewards for the plurality of vendors associated with the category; or a priority ranking assigned to one or more of the plurality of vendors associated with the category.

7. The computer-implemented method of claim 1, wherein:
the purchase price at the first vendor is determined based on one or more of an average transaction value for transactions at the first vendor, or a magnitude of the transaction reward.

8. The computer-implemented method of claim 1, wherein the purchase price at the at least one vendor without the transaction reward is greater than the purchase price at the first vendor.

9. The computer-implemented method of claim 1, further comprising:
receiving an indication that the user has selected, via the user system, the selectable item of the notification; and
updating the historical user information based on the indication.

10. A computer-implemented method of providing a notification for a transaction reward to a user, the computer-implemented method comprising:
monitoring, via a processor of a user system associated with the user, user activity on an electronic application of the user system;
determining, via the monitoring, that the electronic application of the user system is displaying a website page associated with a first vendor, and that the user has a transaction intent at the website page with regard to a category of products;
in response to determining the transaction intent:
transmitting, via the processor of the user system, a request to a notification system for alternative offer information;
receiving, via the processor of the user system and from the notification system, alternative offer information including information associated with (i) at least one vendor, other than the first vendor, that is associated with the category of products and (ii) a corresponding transaction reward for fulfilling a transaction with the at least one vendor, wherein:
the transaction reward is based on historical information associated with one or more of a rewards program or a membership that one or more of the user or the at least one vendor is enrolled in; and
receiving the alternative offer information is indicative that a difference in price value of the alternative offer information is above a threshold difference in price value, wherein:
the threshold difference in price value is based on historical user information associated with the user, and is a threshold difference in price determined by the notification system to be at which one or more of (i) the user is likely to engage with the alternative offer information, or (ii) the alternative offer information is unlikely to raise an offer saturation level of the user to a saturation threshold of the user;
the difference in price value of the alternative offer information is based on a difference between (i) a purchase price of a transaction corresponding to the transaction intent of the user with the at least one vendor that applies the transaction reward, and (ii) a purchase price of a transaction corresponding to the transaction intent of the user with the first vendor; and
only in response to determining that the difference in price is above the threshold difference in price, causing, via the processor of the user system, the user system to display, as a popup window laid over the website page in the electronic application, a notification including the received alternative offer information, wherein the notification further includes a selectable item configured to cause the user system to access a website page associated with the at least one vendor, such that no popup window is caused to be displayed by the processor of the notification system in response to the difference in price not exceeding the threshold difference in price.

11. The computer-implemented method of claim 10, further comprising:
receiving data including an indication that the notification display value of the user system is at or above a notification display threshold; and
in response to receiving the data, causing the monitoring of the user activity to at least temporarily cease.

12. The computer-implemented method of claim 11, wherein the notification display value is based on a number of notifications that were each previously displayed by the user system for at least a predetermined period of time.

13. The computer-implemented method of claim 11, wherein:
the notification display value is based on a number of vendors associated with the category of the transaction intent of the user that have been previously displayed by the user system; and
the notification display threshold is based on a total number of vendors associated with the category of the transaction intent of the user.

14. The computer-implemented method of claim 10, wherein:
a plurality of vendors are associated with the category for the transaction intent of the user; and
the notification includes:
information associated with each of the plurality of vendors associated with the category, and information associated with a respective transaction reward for fulfilling a transaction with each vendor; or
information associated with a selection from the plurality of vendors associated with the category, and information associated with the respective transaction reward for fulfilling the transaction with each selected vendor.

15. The computer-implemented method of claim 14, wherein the selection from the plurality of vendors associated with the category is based on one or more of: a random selection; the respective transaction rewards for the plurality of vendors associated with the category; or a priority ranking assigned to one or more of the plurality of vendors associated with the category.

16. A notification system for providing alternative offer information to a user during a period of time in which the user is making a purchasing decision, the notification system comprising:

a processor; and a memory operatively connected to the processor and storing instructions that are executable by the processor to cause the processor to perform operations including:

receiving, via the processor, an indication that a web browser of a user system associated with the user is displaying a website page associated with a first vendor;

determining that the user associated with the user system has a transaction intention with regard to a category of products in response to determining the transaction intention of the user with regard to the category of products:

determining, via the processor, a purchase price of a transaction corresponding to the transaction intention of the user with the first vendor;

obtaining, via the processor, alternative offer information by:

retrieving (i) vendor information associated with at least one vendor other than the first vendor that is associated with the category of products corresponding to the transaction intention of the user, and (ii) historical information associated with one or more of a rewards program or a membership that one or more of the user or the at least one vendor is enrolled in;

determining a transaction reward for fulfilling a transaction with the at least one vendor, based on the historical information; and determining a purchase price of a transaction corresponding to the transaction intention of the user with the at least one vendor based on the transaction reward and the vendor information;

determining a difference in price between the purchase price at the at least one vendor and the purchase price at the first vendor; and determining, based on historical user information associated with the user, a threshold difference in price at which one or more of (i) the user is likely to engage with the alternative offer information, or (ii) the alternative offer information is unlikely to raise an offer saturation level of the user to a saturation threshold of the user; and determining whether the difference in price exceeds the threshold difference in price; and only in response to determining that the difference in price is above the threshold difference in price, causing, via the processor, the user system to display, as a popup window laid over the website page in the web browser, a notification including the alternative offer information, during the period of time in which the user is making the purchasing decision, wherein the notification further includes a selectable item configured to cause the user system to access a website page associated with the at least one vendor, such that no popup window is caused to be displayed by the processor of the notification system in response to the difference in price not exceeding the threshold difference in price.

17. The notification system of claim 16, wherein the purchase price at the at least one vendor without the transaction reward is greater than the purchase price at the first vendor.

18. The notification system of claim 16, wherein the operations further include:

receiving an indication that the user has selected, via the user system, the selectable item of the notification; and updating the historical user information based on the indication.

\* \* \* \* \*